United States Patent [19]

Landt

[11] 4,142,439
[45] Mar. 6, 1979

[54] BLIND FASTENER ASSEMBLY

[75] Inventor: Richard C. Landt, Souderton, Pa.

[73] Assignee: SPS Technologies, Inc., Jenkintown, Pa.

[21] Appl. No.: 828,704

[22] Filed: Aug. 29, 1977

[51] Int. Cl.$^2$ .................. F16B 13/06; F16B 13/10
[52] U.S. Cl. ........................................... 85/70; 85/77
[58] Field of Search ................. 85/69, 70, 71, 72, 77, 85/78

[56] References Cited

U.S. PATENT DOCUMENTS

| | | | |
|---|---|---|---|
| 2,887,003 | 5/1959 | Brilmyer | 85/72 |
| 3,093,026 | 6/1963 | Mills et al. | 85/70 |
| 3,128,813 | 4/1964 | Davis et al. | 85/70 X |
| 3,136,203 | 6/1964 | Davis | 85/70 |
| 3,222,977 | 12/1965 | Vaughn | 85/72 |
| 3,262,353 | 7/1966 | Waeltz et al. | 85/72 |
| 3,270,793 | 9/1966 | Polmon | 85/70 X |
| 3,277,771 | 10/1966 | Reynolds | 85/72 |
| 3,369,442 | 2/1968 | Darby et al. | 85/70 |
| 3,643,544 | 2/1972 | Massa | 85/72 |
| 3,866,998 | 2/1973 | Iantorno | 85/72 X |
| 4,089,247 | 5/1978 | Dahl et al. | 85/70 |

Primary Examiner—Thomas J. Holke
Attorney, Agent, or Firm—Aaron Nerenberg

[57] ABSTRACT

A blind fastener assembly includes a pin, an expander and a sleeve. The pin and expander may include, in one configuration, mating threads for drawing the sleeve axially over the expander toward the blind side of a workpiece, or the pin may be a pull-type wherein the portion of the pin opposite from the blind side end has pull grooves which are adapted to be gripped by a conventional pull gun. The expander extends through aligned holes in the workpiece and has a tapered nose surface at the blind side end adjacent a reduced thickness cylindrical portion which extends axially to a stop shoulder. The shoulder provides a transition to a normal thickness cylindrical portion which extends through the workpiece holes. The sleeve is a tubular member with a portion of its length having a normal radial thickness and a portion having a reduced radial thickness. In a preferred embodiment, the reduced radial thickness portion comprises a reduced outer diameter over a portion of its axial length and a corresponding counter-bore along the same portion of axial length adjacent the end of the sleeve proximate the tapered nose surface on the expander. When an axial force is exerted on the pin, the reduced thickness portion of the sleeve is forced over the tapered nose surface on the expander and expanded in diameter until it contacts the shoulder on the expander. Continued axial force on the pin causes an outwardly extending bulb to form in the reduced thickness portion of the sleeve at the shoulder. Further axial pulling causes a portion of the sleeve to shear off and remain lodged between the reduced thickness surface of the expander and the shoulder while the formed bulb is further expanded and pulled over the normal thickness surface of the expander outer diameter until it clamps against the surface of the workpiece material.

27 Claims, 11 Drawing Figures

BLIND FASTENER ASSEMBLY

BACKGROUND OF THE INVENTION

This invention relates to improvements in blind fasteners and to the joints produced therewith.

Advanced composite materials have recently been gaining increasing usage in various aerospace applications because they offer potential weight savings and increased stiffness. The anisotropic properties of composite material present a unique opportunity to optimize certain structural designs such as elongated aircraft stringers and ribs. In order to form acceptable joints of relatively thin sheet composite materials, conventional blind fasteners have not proven to be completely acceptable. One reason is the low allowable bearing stress of composite materials which means that the full tensile strength of the blind fastener may not be realized because of bearing failure of the composite material. Present blind fasteners have a relatively limited blind side bearing area and typically expand to approximately 1.3 times the original sleeve diameter. Another reason is that composite materials are weaker in shear, thus causing any holes to require greater edge distances and more area buildup to develop full efficiency of the composite material. These materials are further constructed of a resin matrix which has a tendency to crack when holes in the material are expanded, such as by cold working or by an interference fit fastener. Rivets which swell when upset may also crack the resin matrix. Finally, fasteners which form against the blind side composite material surface tend to damage the relatively soft material surface by digging or gouging out some of the material during the bulb forming process.

In order to solve these problems, the present invention is directed to an improved blind fastener assembly which has a large bearing area, does not expand the holes in the respective workpieces in which the fastener assembly is installed, forms away from the blind side workpiece surface, and in which the formation of the blindside bulb is not sensitive to variations in grip length.

SUMMARY OF THE INVENTION

Accordingly, it is the general purpose and object of the present invention to provide an improved blind fastener assembly. It is a further object to provide an improved blind fastener assembly for use with composite materials. It is yet another object of the present invention to provide an improved blind fastener assembly which forms away from the blind side workpiece surface. It is still another object to provide a blind fastener assembly in which the formation of the blindside bulb is not sensitive to variations in grip length. And it is an object of the present invention to provide a blind fastener assembly which is expandable to approximately 1.5 times its unexpanded diameter.

These and other objects are accomplished according to the present invention by a blind fastener assembly including a pulling pin, a sleeve and an expander. The expander is formed to be placed through an opening in a workpiece, and the pin, with the sleeve carried thereon adjacent a headed, blindside end of the pin, is placed through the expander. One end of the sleeve adjacent a tapered nose surface on the expander has a reduced thickness radial portion over a selected length thereof. The expander includes a reduced thickness circumferential section between the tapered nose surface and a substantially radial shoulder with a normal thickness circumferential section extending from the shoulder to the other end of the expander and registering with the workpiece opening. Upon application of an axial force on the pin, the reduced thickness sleeve portion advances over the tapered nose surface of the expander forcing the reduced thickness portion radially outwardly, and continuing to advance the sleeve over the reduced thickness circumferential section of the expander until it contacts the shoulder. A radially outwardly extending bulb forms adjacent the shoulder, and when sufficient axial force is exerted by the pulling pin, a portion of the edge of the sleeve shears off and the remainder of the bulb portion advances over the shoulder onto the normal thickness circumferential section of the expander until it contacts and bears against the blindside workpiece surface.

DESCRIPTION OF THE PREFERRED EMBODIMENT

Figure 1:
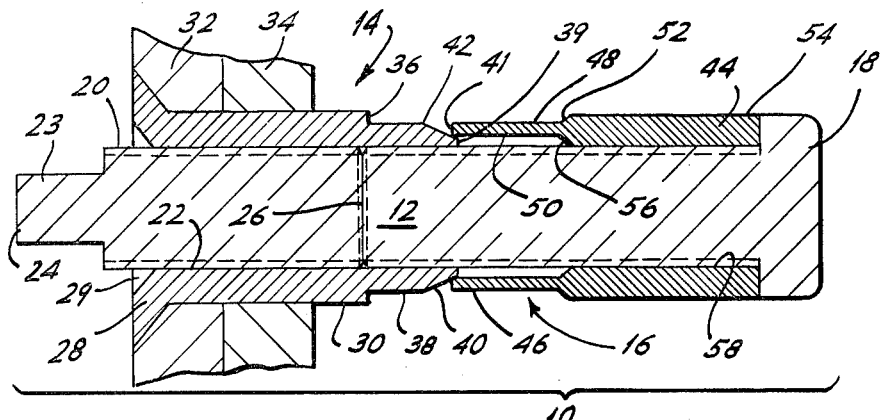
FIG. 1 is a cross-sectional view, with parts in elevation, illustrating one embodiment of a blind fastener assembly installed in a pair of workpieces prior to any forming operation, in accordance with the present invention.

Referring to FIGS. 1 - 4, a first embodiment of a blind fastener assembly in accordance with the present invention is shown in varying stages of installation. Fastener assembly 10 includes a pin member 12, an expander 14, and a sleeve 16. Pin member 12 has an enlarged head 18 at one end thereof and may, in one configuration, include standard external threads 20 which are designed to engage mating threads 22 on expander 14 in order to draw sleeve 16, which is carried on the shank of pin member 12 adjacent head 18, axially toward expander 14. In the particular configuration shown, a wrenching configuration such as a pair of flats 23 are included on pin member 12 at a free end 24 for accepting a power tool driving bit. It should be understood that pin member 12 may include a plurality of circumferential grooves (not shown) adjacent end 24 instead of external threads 20 and mating threads 22 on expander 14. Such grooves are commonly employed on similar pulling pin devices and are formed to be gripped by any one of a number of conventional pull-type guns for exerting the necessary axial force on pin member 12. This arrangement is not illustrated because it is quite conventional and fully known to those skilled in the art. Pin member 12 also includes a breakneck groove 26 of reduced cross-sectional diameter, which is designed to fracture at a predetermined axial pull or torsional load.

Expander 14 includes an enlarged head 28, a first shank portion 30 of constant outside diameter which extends through aligned openings in a pair of workpieces 32 and 34, a substantially radial shoulder 36 between shank portion 30 and a reduced thickness shank portion 38, and a nose portion on the opposite end 39 from head 28 having a tapered surface 40. Tapered surface 40 forms an angle on the order of approximately 20° with the longitudinal axis of expander 14, but may generally be within a range of about 15° to 30°. The intersection line between shank portion 38 and tapered surface 40 will be designated as 42. Head 28 is designed to bear upon a corresponding counter-sunk section in workpiece 32, and surface 30 is designed to fit through the aligned openings with a relatively close tolerance (i.e. something less than an interference fit). Head 28 may include a recess 29 for accepting a portion of the power tool bit (not shown) to keep expander 14 from rotating during the assembly of the joint. It is to be understood that head 28 may be of any configuration while still remaining within the scope of the present invention.

Sleeve 16 includes a normal radial thickness portion 44 adjacent head 18 of pin member 12, and a reduced radial thickness portion 46 adjacent end 39 of expander 14. Portion 46 includes a reduced outside diameter surface 48 and a corresponding counter-bored inside diameter surface 50. Typically, but not necessarily, the thickness of portion 46 is approximately equal to the height of shoulder 36 on expander 14. A shoulder 52 joins surface 48 and the outside diameter surface 54 of portion 44, and a shoulder 56 joins inside diameter surface 50 and the inside surface 58 of portion 44.

Figure 2:
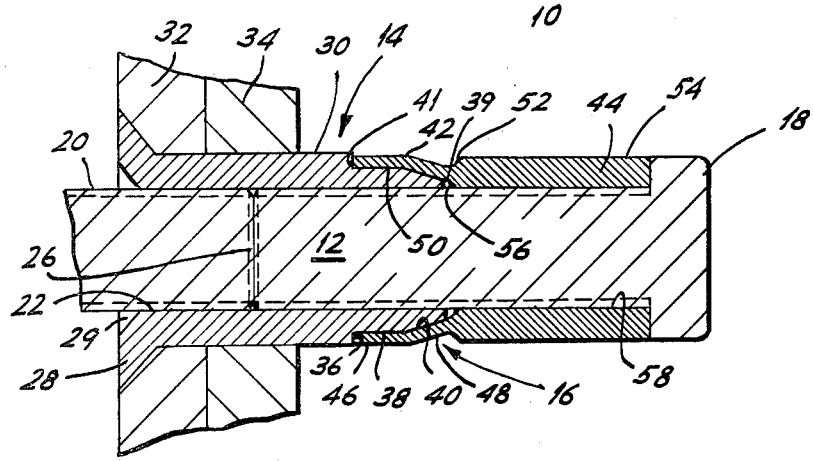
FIG. 2 shows the embodiment of FIG. 1 in a first intermediate condition.
Figure 3:
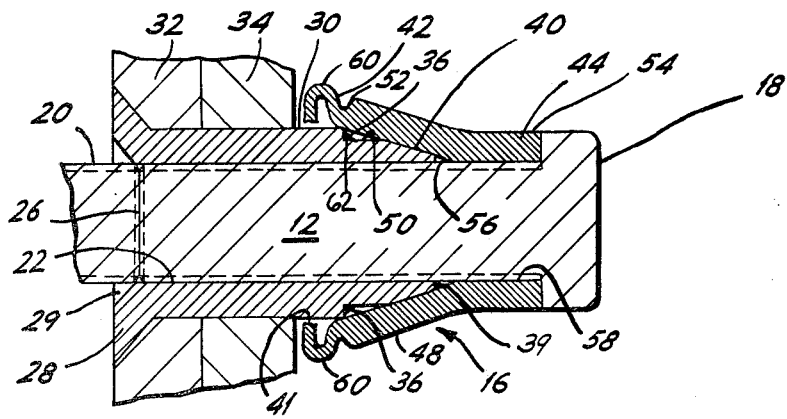
FIG. 3 shows the embodiment of FIG. 1 in a second intermediate, partially formed condition.
Figure 4:
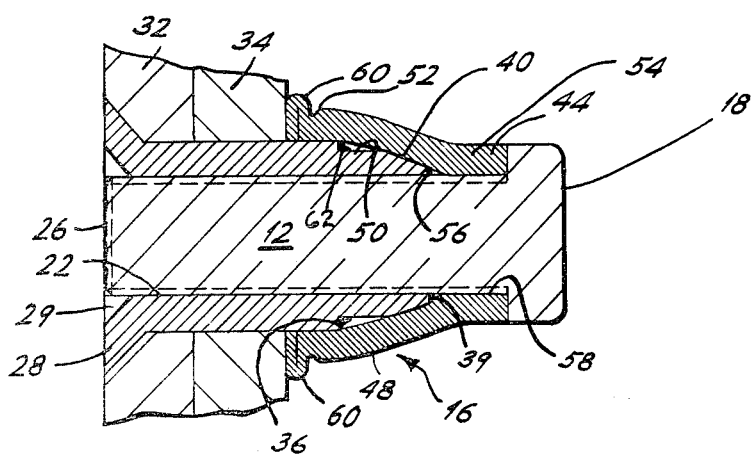
FIG. 4 shows the embodiment of FIG. 1 in a finally formed condition.

When an axial force is exerted on pin member 12, such as by torquing the pin or by pulling on the pin by means of a pull gun (not shown), surface 50 on sleeve 16 contacts tapered surface 40 on expander 14, and portion 46 begins to advance over the tapered surface where it is expanded from its original diameter. Portion 46 continues to advance over intersection 42 of surfaces 38 and 40 along surface 38 of expander 14 until the free end 41 of portion 46 contacts shoulder 36, as shown in FIG. 2. At this point, intersection 42 should be approximately mid-way between the ends of reduced thickness portion 46 in an optimum configuration joint. Optimum dimensional relationships between the length of portion 46 and the distance from shoulder 36 to intersection 42 of expander 14 will be discussed more fully hereinafter. As pin member 12 continues to advance in an axial direction, portion 46 begins to bulb radially outwardly at approximately the middle of its length, causing a maximum diameter bulb 60 to form in an optimum configuration adjacent shoulder 36. Continued torquing or pulling of pin member 12 causes a portion of the tip 62 of sleeve 16 to shear off, as the sleeve with bulb 60 already formed, advances along surface 30 of expander 14 until it contacts and bears against the blind side of workpiece member 34. The fully formed, maximum diameter bulb is typically about 1.5 times the original unexpanded diameter of sleeve 16. Thereupon, the pin fractures at breakneck groove 26, resulting in the final assembled joint shown in FIG. 4. It should be understood that some form of locking configuration (not shown) may be provided between member 12 and expander 14 to keep the pin from moving in an axial direction after the joint is clamped and to maintain preload in the joint. It is also pointed out that reduced thickness portion 46 could be selectively annealed along its length to provide a hardness gradient with the softest point being at approximately the mid-point of portion 46, in order to insure that the bulb forms at the optimum location to produce a maximum diameter and optimum-shaped bulb. Lubricants can also be provided between the contacting surfaces of expander 14 and sleeve 16 to reduce the forces required to expand and bulb the sleeve.

Figure 5:
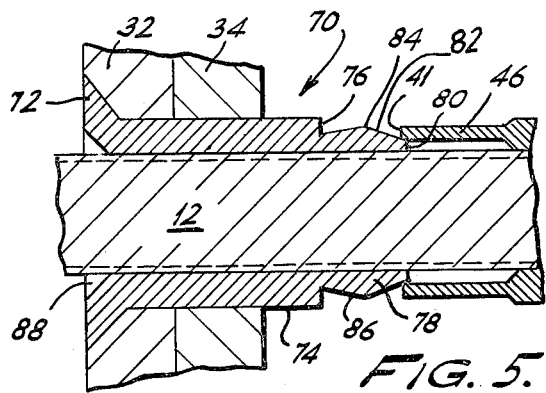
FIG. 5 is a partial cross-sectional view of a second embodiment of the expander shown in FIG. 1.
Figure 6:
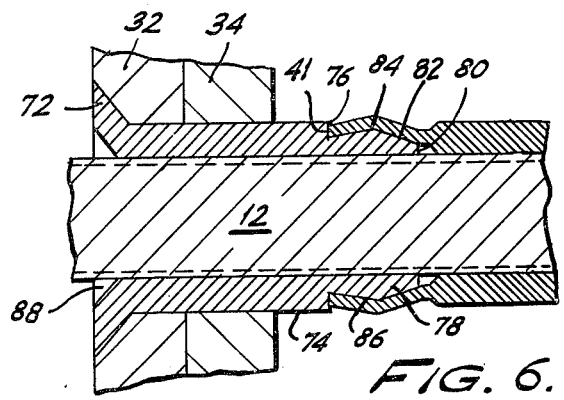
FIG. 6 shows the embodiment of FIG. 5 in an intermediate condition similar to FIG. 2.

Referring now to FIGS. 5 and 6, an alternate embodiment of the expander 14 of FIGS. 1 – 4 is illustrated. It should be understood that all of the other components of the blind fastener assembly illustrated in FIGS. 1 – 4 remain the same, and therefore only the features of the expander need be described. An expander 70 includes an enlarged head 72, a first shank portion 74 of constant outside diameter which extends through the aligned openings in the workpieces, a substantially radial shoulder 76 between shank portion 74 and a varying thickness shank portion 78, and a nose portion on the opposite end 80 from head 72. The nose portion includes a tapered surface 82 tapering away from the longitudinal axis of the expander at an angle within the range of approximately 15° to 30°, with a preferred angle of 20°, to an intersection line 84 at which line a second tapered surface 86 tapers back toward the longitudinal axis of the expander at an angle within the range of approximately 5° to 20° until it intersects with shoulder 76. Several advantages are obtained in certain instances by the reverse taper configuration of FIG. 5 and 6. First, intersection line 84 is more pronounced in assisting the preforming of reduced thickness portion 46 of sleeve 16; and second, the reverse taper creates an acute angle between surfaces 76 and 86 in order to help trap tip 41 of sleeve 16 and cause bulb 60 to form. While preferred values of the respective angles of taper have been given, it should be understood that these values could vary depending on certain performance parameters associated with installing the blind fastener assembly. As in the previous embodiment, head 72 is designed to bear upon a corresponding countersunk section in the accessible workpiece, and surface 74 is designed to fit through aligned openings in the workpieces with a relatively close tolerance. As in the previously described embodiment, head 72 may also include a recess 88 for accepting a portion of the power tool bit (not shown) to keep expander 70 from rotating during the assembly of the joint. It should also be understood that head 72 may be of any configuration while still remaining within the spirit and scope of the present invention.

Figure 7:
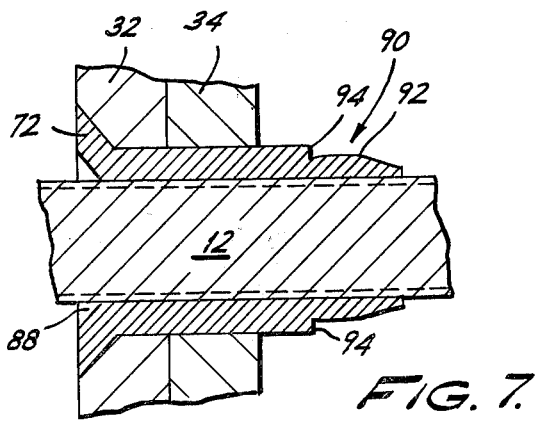
FIGS. 7 and 8 are partial cross-sectional views of alternate embodiments of the expander shown in FIGS. 1 - 4.
Figure 8:
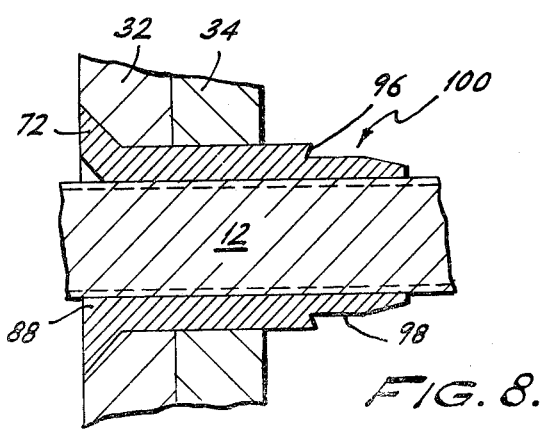

Several more alternate embodiments of the expander are illustrated in FIGS. 7 and 8. In FIG. 7, an expander 90 is shown including a curved surface 92 instead of surface 38 in FIGS. 1 – 4 or surface 86 in FIGS. 5 – 6. The curvature of surface 92 may be varied to suit the particular installation. A shoulder 94 may be oriented substantially radially, as shown in FIG. 7, or at an acute angle as illustrated by shoulder 96 and surfaces 98 in expander 100 of FIG. 8. The remaining configuration of the alternate expander embodiments is as shown and described in the embodiments of FIGS. 1 – 6.

Referring again to FIGS. 5 and 6, during installation, tip portion 41 of sleeve 16 advances along tapered surface 82, where the sleeve is expanded from its original diameter. Reduced thickness portion 46 continues to advance over intersection 84 and along reverse tapered surface 86 until tip 41 contacts shoulder 76, as illustrated in FIG. 6. Further axial force causes portion 46 to bulb radially outwardly originating at approximately intersection line 84, and thereafter, a portion of tip 41 shears off (not shown) as in the previous embodiment allowing the sleeve with the formed bulb to advance along surface 74 until it contacts and bears against the blind side workpiece surface.

Figures 9, 10:
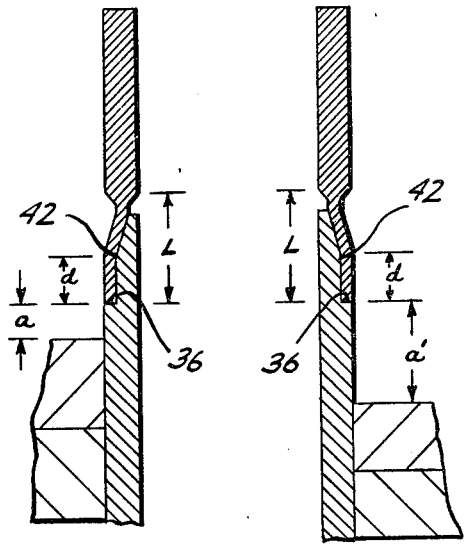
FIGS. 9 and 10 are partial cross-sectional views of the sleeve and expander of FIGS. 1 - 4 showing dimensional relationships in respective maximum grip and minimum grip conditions.

Referring now to FIGS. 9 and 10, a portion of the sleeve and expander of FIGS. 1 - 4 are shown in respective minimum and maximum grip conditions in joints. Critical dimensional relationships will be discussed with reference to these figures. Dimension "L" represents the axial length of reduced thickness portion 46 of sleeve 16, and dimension "d" represents the distance from shoulder 36 to intersection line 42 between surfaces 38 and 40 on expander 14.

Figure 11:
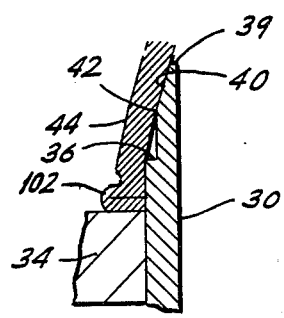
FIG. 11 shows the bulb formed according to the dimensional relationships shown in FIG. 9.

A critical dimensional relationship exists between the position of shoulder 36 on expander 14 relative to the position of sleeve 16 at the time during installation when the leading edge 41 of the sleeve contacts shoulder 36. As mentioned previously with respect to the formation of the joint in FIGS. 1 - 4, reduced thickness portion 46 advances along surfaces 40 and 38 of expander 14, and is deformed at intersection line 42 when the leading edge 41 contacts shoulder 36. Deformation of the sleeve takes place at intersection line 42, however, only if the intersectiion line is located somewhere within dimension "L" of portion 46 on sleeve 16 when edge 41 contacts shoulder 36. The optimum location of intersection line 42 is when $d = L/2$, since with this dimensional configuration, the bulb will start to form in the center of the column (reduced thickness portion 46), producing an optimum-shaped, maximum diameter bulb 102, as illustrated in FIG. 11. If intersection line 42 is not located within dimension "L", a bulb of smaller diameter, and not optimally shaped will form at shoulder 36. Since in this hypothetical situation, intersection line 42 is not located within length "L" of reduced thickness portion 46, the intersection line has no effect on where the bulb forms.

Dimension "a" in FIG. 9 is the minimum distance from the blind side workpiece surface to shoulder 36 in order to insure that bulb 102 is fully expanded when the workpiece thickness is at a maximum. This is referred to as a maximum grip condition. Preferably, dimension "a" is at least equal to twice the radial thickness of sleeve portion 46, in order to minimize the overall length of the blind fastener assembly. In FIG. 10, a minimum grip condition is shown wherein the workpiece thickness is at a minimum. Dimension "a'" represents the maximum distance from the blindside workpiece surface to shoulder 36 and thus is equal to "a" plus the allowable grip range of the blind fastener assembly. It should be kept in mind, though, that dimension "a'" is not critical to the formation of the bulb which has a sufficient length of expander surface 30 in which to fully form and expand.

Having thus described several embodiments of the present invention, some of the many advantages should now be readily apparent. Formation of an optimum-shaped maximum diameter bulb which will repeatedly form away from the blind side workpiece surface is achieved by the present invention. There is no radial expansion of the workpiece holes during the formation of the joint. Formation of the blind side bulb is not sensitive to variations in grip length (i.e. workpiece thickness). Because of the controlled size and shape of the bulb which is formed, the blind fastener assembly of the present invention is ideally suited for use with advanced composite materials. In addition, no damage or marring of the surface is produced during formation of the bulb away from the blind side workpiece surface. It should also be clearly understood that the blind fastener assembly of the present invention is equally useful with conventional aerospace materials other than composite materials.

While in the foregoing there have been described several preferred embodiments of the invention, it should be understood that various changes and modifications can be made without departing from the true spirit and scope of the invention as recited in the appended claims.

I claim:

1. A blind fastener assembly for installation in a workpiece having a first and a second surface with an opening therethrough, said assembly comprising:

a pin member including an enlarged head at one end thereof formed to be placed adjacent the second workpiece surface, an elongated shank portion extending from said enlarged head and means on said shank portion operative to advance said pin member in a direction along its longitudinal axis;

expander means including an enlarged head at one end thereof formed to bear upon the first workpiece surface, a tapered surface of varying radial thickness in a longitudinal direction adjacent the other end thereof, said tapered surface varying from a minimum radial thickness at said other end to a maximum radial thickness at a locus of points spaced from said other end, a shoulder between said enlarged head and said tapered surface, a first shank portion extending from said tapered surface to said shoulder, and a second shank portion extending from said shoulder to said enlarged head, said second shank portion having an outer surface formed to be placed in the workpiece opening and to extend therebeyond such that said shoulder is located beyond the opening adjacent the second workpiece surface, and said expander means having an internal bore extending therethrough carrying said pin member shank portion; and expandable sleeve means carried on said pin member shank portion proximate said enlarged head, said sleeve means including a first portion of greater radial thickness adjacent one end thereof proximate said pin member enlarged head and a second portion of reduced radial thickness adjacent the other end thereof juxtaposed from said minimum thickness end of said expander means tapered surface, said sleeve second portion being adapted to be advanced along said expander means tapered surface and said first shank portion and expanded thereover upon advancement of said pin member toward said shoulder, said other end of said sleeve means ultimately contacting said shoulder and forming a radially outwardly extending bulb with its apex intermediate the ends of said sleeve means second portion, said bulb thereafter advancing over said shoulder and along said expander means second shank portion until it contacts and bears against the second workpiece surface.

2. A blind fastener assembly in accordance with claim 1 wherein said shoulder is substantially perpendicular to the longitudinal axis of said expander means.

3. A blind fastener assembly in accordance with claim 1 wherein said shoulder forms an acute angle with said expander means first shank portion.

4. A blind fastener assembly in accordance with claim 1 wherein said sleeve second portion has a reduced radial distance to the outside surface thereof and an increased radial distance to the inside surface thereof each relative to the radial distance to the respective outside and inside surfaces of said first portion, whereby there is a discontinuity in the outside surface and in the inside surface of said sleeve means at the junction of said first and said second portions.

5. A blind fastener assembly in accordance with claim 1 wherein said pin member further includes a portion of reduced cross-section designed to break at a predetermined load greater than the load necessary to form said bulb.

6. A blind fastener assembly in accordance with claim 1 wherein said means on said shank portion operative to advance said pin member is an external thread, and wherein said expander means further includes a mating internal thread on said internal bore thereof.

7. A blind fastener assembly in accordance with claim 1 wherein said expander means tapered surface forms an angle within the range of approximately 15° to 30° with the longitudinal axis of said expander means.

8. A blind fastener assembly in accordance with claim 1 wherein said expander means tapered surface forms an angle on the order of 20° with the longitudinal axis of said expander means.

9. A blind fastener assembly in accordance with claim 1 wherein a first distance from said expander means shoulder to said maximum radial thickness of said tapered surface is less than the axial length of said sleeve second portion.

10. A blind fastener assembly in accordance with claim 9 wherein said first distance is equal to approximately one half of the axial length of said sleeve second portion.

11. A blind fastener assembly in accordance with claim 1 wherein said second shank portion is of greater cross-sectional area than said first shank portion.

12. A blind fastener assembly in accordance with claim 1 wherein the surface of said first shank portion is curved.

13. A blind fastener assembly in accordance with claim 1 wherein the surface of said first shank portion is at an acute angle with respect to the longitudinal axis of said expander means.

14. A joint assembly comprising:
a workpiece having a first surface, a second surface and an opening therebetween;
a pin member having an enlarged head at one end thereof formed to be placed adjacent said second workpiece surface, an elongated shank portion extending from said enlarged head and means on said shank portion operative to advance said pin member in a direction along its longitudinal axis;
expander means having an enlarged head at one end thereof formed to bear on said first workpiece surface, a tapered surface of varying radial thickness in a longitudinal direction adjacent the other end thereof, said tapered surface varying from a minimum radial thickness at said other end to a maximum radial thickness at a locus of points spaced from said other end, a shoulder between said enlarged head and said tapered surface, a first shank portion extending from said tapered surface to said shoulder, and a second shank portion extending from said shoulder to said enlarged head, said second shank portion having an outer surface formed to be placed in said workpiece opening and to extend therebeyond such that said shoulder is located beyond said opening adjacent said second workpiece surface, and an internal bore extending through said expander means carrying said pin member shank portion; and
expandable sleeve means carried on said pin member shank portion proximate said enlarged head, said sleeve means including a first portion of greater radial thickness adjacent one end thereof proximate said pin member enlarged head and a second portion of reduced radial thickness adjacent the other end thereof juxtaposed from said minimum thickness end of said expander means tapered surface, said sleeve second portion being adapted to be advanced along said expander means tapered surface and said first shank portion and expanded thereover upon advancement of said pin member toward said shoulder, said other end of said sleeve means ultimately contacting said shoulder and forming a radially outwardly extending bulb with its apex intermediate the ends of said sleeve means second portion, said bulb thereafter advancing over said shoulder and along said expander means second shank portion until it contacts and bears against said second workpiece surface.

15. A joint assembly in accordance with claim 14 wherein said shoulder is substantially perpendicular to the longitudinal axis of said expander means.

16. A joint assembly in accordance with claim 14 wherein said shoulder forms an acute angle with said expander means first shank portion.

17. A joint assembly in accordance with claim 14 wherein said sleeve second portion has a reduced radial distance to the outside surface thereof and an increased radial distance to the inside surface thereof each relative to the radial distance to the respective outside and inside surfaces of said first portion, whereby there is a discontinuity in the outside surface and in the inside surface of said sleeve means at the junction of said first and said second portions.

18. A joint assembly in accordance with claim 14 wherein said pin member further includes a portion of reduced cross-section designed to break at a predetermined load greater than the load necessary to form said bulb.

19. A joint assembly in accordance with claim 14 wherein said means on said shank portion operative to advance said pin member is an external thread, and wherein said expander means further includes a mating internal thread on said internal bore thereof.

20. A joint assembly in accordance with claim 14 wherein said expander means tapered surface forms an angle within the range of approximately 15° to 30° with the longitudinal axis of said expander means.

21. A joint assembly in accordance with claim 14 wherein said expander means tapered surface forms an angle on the order of 20° with the longitudinal axis of said expander means.

22. A joint assembly in accordance with claim 14 wherein a first distance from said expander means shoulder to said maximum radial thickness of said tapered surface is less than the axial length of said sleeve second portion.

23. A joint assembly in accordance with claim 22 wherein said first distance is equal to approximately one half of the axial length of said sleeve second portion.

24. A joint assembly in accordance with claim 14 wherein said second shank portion is of greater cross-sectional area than said first shank portion.

25. A joint assembly in accordance with claim 14 wherein the surface of said first shank portion is curved.

26. A joint assembly in accordance with claim 14 wherein the surface of said first shank portion is at an acute angle with respect to the longitudinal axis of said expander means.

27. A joint assembly in accordance with claim 14 wherein a minimum distance from said second workpiece surface to said expander means shoulder is equal to at least twice the radial thickness of said sleeve means second portion.

* * * * *